United States Patent
Bergerson et al.

(10) Patent No.: US 8,625,250 B2
(45) Date of Patent: Jan. 7, 2014

(54) COMPRESSION-MOLDED PARTS HAVING AN EMBEDDED CONDUCTIVE LAYER AND METHOD FOR MAKING SAME

(75) Inventors: Anthony P. Bergerson, Cedar Hill, TX (US); Jason L. Hoyle, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 2 days.

(21) Appl. No.: 13/552,781

(22) Filed: Jul. 19, 2012

(65) Prior Publication Data

US 2013/0328226 A1 Dec. 12, 2013

Related U.S. Application Data

(62) Division of application No. 11/660,772, filed as application No. PCT/US2005/017916 on May 23, 2005.

(60) Provisional application No. 60/606,317, filed on Sep. 1, 2004.

(51) Int. Cl.
*H05F 3/00* (2006.01)

(52) U.S. Cl.
USPC .......................................................... 361/218

(58) Field of Classification Search
USPC .......................................................... 361/218
See application file for complete search history.

(56) References Cited

U.S. PATENT DOCUMENTS

| | | | |
|---|---|---|---|
| 3,755,713 A | 8/1973 | Paszkowski |
| 3,878,387 A | 4/1975 | Kovacic |
| 4,402,779 A | 9/1983 | Levy |
| 4,647,495 A | 3/1987 | Kanayama |
| 4,746,389 A | 5/1988 | DiGenova |
| 4,882,089 A | 11/1989 | Iwaskow et al. |
| 5,127,601 A | 7/1992 | Schroeder |
| 5,314,309 A | 5/1994 | Blakeley et al. |
| 5,352,565 A | 10/1994 | Schroeder |
| 5,370,921 A | 12/1994 | Cedarleaf |

(Continued)

FOREIGN PATENT DOCUMENTS

| | | |
|---|---|---|
| EP | 0465399 A2 | 1/1992 |
| JP | 63293018 A | 11/1988 |
| WO | 2005/056383 A2 | 6/2005 |
| WO | WO 2005/056383 | 6/2006 |

OTHER PUBLICATIONS

European Office Action dated Feb. 15, 2011 from counterpart EP Application No. 05819508.1.

(Continued)

*Primary Examiner* — Dharti Patel

(74) *Attorney, Agent, or Firm* — James E. Walton; Damon R. Hickman

(57) ABSTRACT

A compression-molded part has a conductive layer embedded in the part during molding of the part. The conductive layer is generally adjacent an outer surface of the part and is preferably formed from a mesh, a foil, a pulled screen, or multiple layers of conductive elements. The part is preferably optimized for use on the exterior of an aircraft for lightning-strike or EMI protection or for use as an antenna. Methods for forming the panels of the invention include placing the conductive layer against a mold surface of a compression mold, then forming the compression-molded part with the conductive layer embedded in the part.

4 Claims, 3 Drawing Sheets

(56) References Cited

U.S. PATENT DOCUMENTS

| | | | |
|---|---|---|---|
| 5,384,185 | A | 1/1995 | Bovenschen et al. |
| 5,417,385 | A | 5/1995 | Arnold |
| 5,499,782 | A | 3/1996 | Domine |
| 5,817,736 | A | 10/1998 | Von Gentzkow et al. |
| 5,846,634 | A | 12/1998 | Werth |
| 5,865,397 | A | 2/1999 | Herrmann |
| 5,957,717 | A | 9/1999 | Monsef et al. |
| 6,280,874 | B1 | 8/2001 | Hensley et al. |
| 6,303,206 | B1 | 10/2001 | Brick |
| 7,161,542 | B2 | 1/2007 | Endo et al. |
| 2002/0038799 | A1 | 4/2002 | Laken et al. |
| 2004/0031510 | A1 | 2/2004 | Li |
| 2004/0069895 | A1 | 4/2004 | Pham et al. |
| 2004/0121674 | A1* | 6/2004 | Robbins ............... 442/38 |

OTHER PUBLICATIONS

European Office Action dated Mar. 28, 2012 from counterpart EP Application No. 05819508.1.
Chinese Office Action dated Mar. 1, 2010 from counterpart CN Application No. 200580029399.5.
Chinese Office Action dated Nov. 21, 2011 from counterpart CN Application No. 200580029399.5.
Canadian Office Action dated May 7, 2010 from counterpart CA Application No. 2,577,029.
Restriction Requirement dated Aug. 6, 2010 from counterpart U.S. Appl. No. 11/660,772.
Response to Restriction Requirement dated Aug. 17, 2010 from counterpart U.S. Appl. No. 11/660,772.
Office Action dated Sep. 16, 2010 from counterpart U.S. Appl. No. 11/660,772.
Amendment dated Oct. 7, 2010 from counterpart U.S. Appl. No. 11/660,772.
Final Office Action dated Oct. 7, 2010 from counterpart U.S. Appl. No. 11/660,772.
Amendment After Final dated Jan. 13, 2011 from counterpart U.S. Appl. No. 11/660,772.
Advisory Action dated Feb. 3, 2011 from counterpart U.S. Appl. No. 11/660,772.
Office Action dated Mar. 18, 2011 from counterpart U.S. Appl. No. 11/660,772.
Amendment dated Jun. 8, 2011 from counterpart U.S. Appl. No. 11/660,772.
Final Office Action dated Aug. 17, 2011 from counterpart U.S. Appl. No. 11/660,772.
Amendment After Final dated Oct. 5, 2011 from counterpart U.S. Appl. No. 11/660,772.
Advisory Action dated Oct. 19, 2011 from counterpart U.S. Appl. No. 11/660,772.
Office Action dated Nov. 21, 2011 from counterpart U.S. Appl. No. 11/660,772.
Amendment dated Feb. 13, 2012 from counterpart U.S. Appl. No. 11/660,772.
Notice of Allowance dated May 11, 2012 from counterpart U.S. Appl. No. 11/660,772.

* cited by examiner

COMPRESSION-MOLDED PARTS HAVING AN EMBEDDED CONDUCTIVE LAYER AND METHOD FOR MAKING SAME

CROSS REFERENCE TO RELATED APPLICATIONS

This application is a divisional of U.S. application Ser. No. 11/660,772, filed 21 Feb. 2007, titled "Compression-Molded Parts Having an Embedded Conductive Layer and Method for Making Same," which claims the benefit of International PCT Application No. PCT/US05/17916, filed 23 May 2005, titled "Compression-Molded Parts Having an Embedded Conductive Layer and Method for Making Same," which claims the benefit of Provisional Application No. 60/606,317, filed 1 Sep. 2004, titled "Compression-Molded Parts Having an Embedded Conductive Layer and Method for Making Same," all of which are both hereby incorporated by reference for all purposes as if fully set forth herein.

GOVERNMENT LICENSE RIGHTS

The U.S. Government has a paid-up license in this invention and the right in limited circumstances to require the patent owner to license others on reasonable terms as provided for by the terms of Contract No. N00019-96-C-0128 awarded by NAVAIR.

BACKGROUND

1. Field of the Present Description

The present invention relates generally to the field of molded parts and relates particularly to compression-molded parts having an embedded conductive layer.

2. Description of Related Art

Compression-molded parts are fabricated using a matched die set consisting of male and female dies. The molding material, which may be a powder, pellets, sheet, a putty-like mass, or a liquid, is introduced into the female die in a partially cured condition and may be preheated prior to being placed in the die. The mold is then closed with the male die member, pressure is applied to force the material into contact with all mold areas, and heat and pressure are maintained until the molding material has cured. The process employs thermosetting resins, and advanced composite thermoplastics may also be compression molded with unidirectional tapes, woven fabrics, randomly orientated fiber mat, or chopped strand. The advantage of compression molding is its ability to mold large, fairly intricate parts with very little labor cost.

Certain compression-molded external fairings and panels on aircraft require lightning strike protection. Prior art methods of providing lighting protection to compression-molded parts include: (1) secondary bonding of a copper mesh to the part via a structural adhesive layer; and (2) painting the compression-molded part with copper-filled paint. A key disadvantage of the secondary bonding process is the added weight of the adhesive. In addition, there is an increase in per-unit cost due to the inherent post-molding processing, the need for additional tooling, and any required rework or repair of surface imperfections. The copper-paint method has a high weight penalty and may provide inconsistent protection due to variations in application thickness. In addition, the copper paint can be easily damaged during routine maintenance and can be inadvertently removed during repair or repaint situations.

DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DETAILED DESCRIPTION

The present invention represents the discovery that molded parts capable of providing lightning-strike protection may be formed by compression molding parts having an embedded conductive layer. The present invention may also be used to provide a conductive surface as required for electro-static discharge applications, for antennas, or for protection from EMI (electromagnetic interference, also called RFI, or radio frequency interference).

Figure 1:
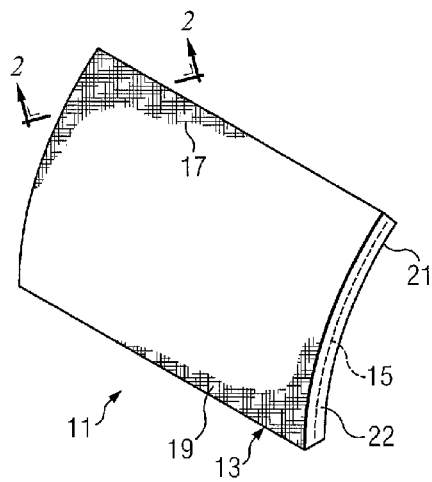
FIG. 1 is a perspective view of a compression-molded aircraft part according to the invention.

FIG. 1 shows a panel 11, which may be a panel forming a portion of the outer skin of an aircraft, having a conductive mesh 13 embedded in an outer portion of a member 15. Member 15 is compression molded from a curable molding material, such as a thermoset plastic, to form a preferably rigid material. Member 15 may be compression molded from composites, such as those containing glass or carbon fibers, including unidirectional tapes, woven fabrics, randomly orientated fiber mat, or chopped strand. The preferred embodiment is formed from sheets containing chopped fibers or from bulk material, which may be chopped fibers covered with resin. Member 15 is shown as a curved part, though member 15 may alternatively be formed as a planar or cup-shaped part.

Mesh 13 comprises multiple conductive elements 17, and these may be formed from any material having conductivity sufficient for use as an antenna or to conduct the current caused by a lightning strike. Conductive elements 17 formed from copper are particularly suited for use in mesh 13, though conductive elements 17 formed from aluminum or other metals may have mechanical, thermal, or electro-chemical properties that may be advantageous in certain applications. Elements 17 may form a woven mesh, a foil, or a pulled screen, or one or more layers of individual conductive elements 17 may be used. Mesh 13 is embedded in member 15 generally adjacent outer surface 19, though mesh 13 may be located a small distance away from surface 19 as long as mesh 13 remains visible through surface 19. For example, it may be desirable for resin to cover mesh 13 to prevent damage or corrosion, though the lightning-strike effectiveness is reduced if fibers of the molding material cover mesh 13. Where desirable, an additional mesh 13 may be embedded in member 15 generally adjacent inner surface 21. Ends 22 of conductive elements 17 preferably extend to, or may protrude from, the edges of member 15, allowing mesh 13 to be conductively connected to mesh 13 of additional panels 11 or to metal structures for dissipation of electrical energy in mesh 13. Mesh 13 may alternatively be conductivity connected to additional panels 11 other structures through metal fasteners or inserts extending through panel 11 and in conductive contact with mesh 13.

Figure 2:
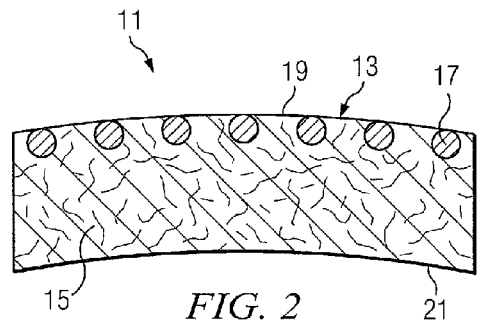
FIG. 2 is a cross-sectional side view of a portion of the molded aircraft part of FIG. 1 along the II-II line.

FIG. 2 is a cross-sectional view of panel 11 taken along the line II-II in FIG. 1. Member 15 has a cross-sectional thickness selected for the particular application, and this thickness does not determine the effectiveness of mesh 13 due to the positioning of mesh 13 at or near surface 19. Conductive elements 17 are shown as adjacent, or tangent to, outer surface 19, though elements 17 may be located a small distance away from outer surface 19, as described above.

Figure 3:
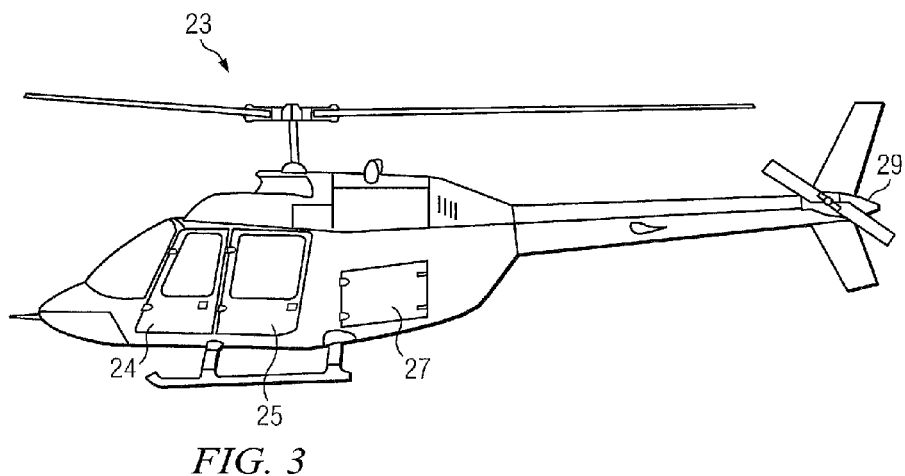
FIG. 3 is a side view of an aircraft having molded parts according to the invention.

FIG. 3 shows an aircraft, helicopter 23, having exterior panels according to the present invention in locations typical of where parts formed like panel 11 may be used. For example, doors 24, 25 may be formed according to the present invention as compression-molded parts having an embedded conductive layer, as may access panel 27 and tail fairing 29. Though not shown, other applications also include the fore and aft fairings on weapons pylons on military aircraft. Parts formed according to the present invention may be used on any appropriate outer surface, as long as the mechanical (e.g., aerodynamic, structural) loads and thermal conditions do not preclude their use.

If panel 11 is struck by a bolt of lightning or other electrical discharge, the electrical charge is conducted from the strike location by conductive elements 17, ends 22 (FIG. 1) of which are preferably conductively connected at the outer edges of panel 11 to adjacent panels 11 or to metal structures of the aircraft. As shown in FIG. 2, conductive elements 17 have a cross-sectional thickness, and this thickness will be selected, based on the material used to form elements 17 and on the number of elements 17 embedded in panel 11, to ensure sufficient capability to conduct the high current produced in a lightning strike. The same considerations would be used to select the appropriate mesh 13 for use as an antenna.

Figure 4:
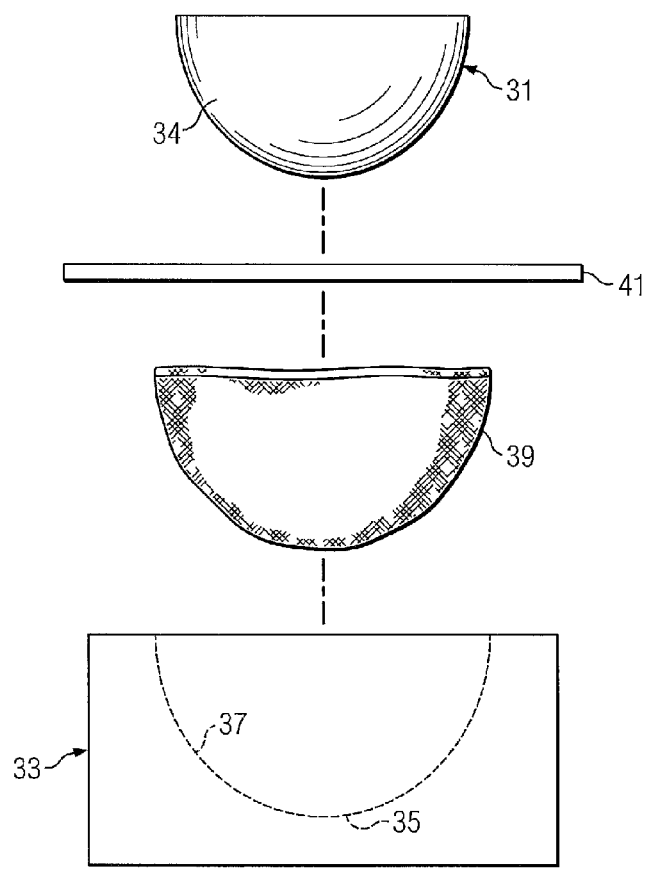
FIG. 4 is an exploded side view of the components used in the method according to the invention for forming molded parts according to the invention.

The present invention also provides for a method for forming compression-molded parts with an embedded conductive layer. FIG. 4 shows a mold comprising male die 31 and a matched female die 33. Male die 31 has an outer mold surface 34. Female die 33 has a mold cavity 35 shaped for receiving male die 31, and cavity 35 has an inner mold surface 37. Though shown as spherical, mold cavity 35 may be formed to have any appropriate shape required for the finished part. A conductive mesh 39, which is constructed like mesh 13 of FIG. 1, may be provided as a preform, as shown, having the general shape of mold cavity 35. Alternatively, mesh 39 may be provided in any appropriate form, such as multiple pieces, which is described below. In the figure, a sheet 41 of partially-cured, resin-coated fibers is provided, though bulk material may alternatively be used.

Figure 5:
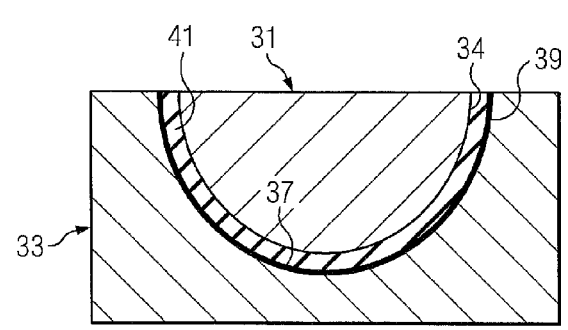
FIG. 5 is a cross-sectional view of the components of FIG. 4 assembled.

To form the part, mesh 39 is inserted into mold cavity 35 and pressed against inner surface 37 to conform mesh 39 to the shape and contours of inner surface 37. A sheet 41 of molding material is then placed in mold cavity 35 adjacent mesh 39, and male die 31 is inserted into female die 33. Insertion of male die 31 compresses sheet 41 against mesh 39 and conforms sheet 41 to outer surface 34 and to inner surface 37. This configuration is illustrated in FIG. 5, with male die 31 shown as fully pressed into female die 33 and compressing sheet 41 and mesh 39 in the space between outer surface 34 and inner surface 37. Resin within sheet 41 flows around the conductive elements of mesh 39. Pressure forcing dies 31, 33 together may be maintained, and the mold is heated to cure the resin in sheet 41. After curing, male die 31 is withdrawn from mold cavity 35, and the finished part is then removed from cavity 35.

Figure 6:
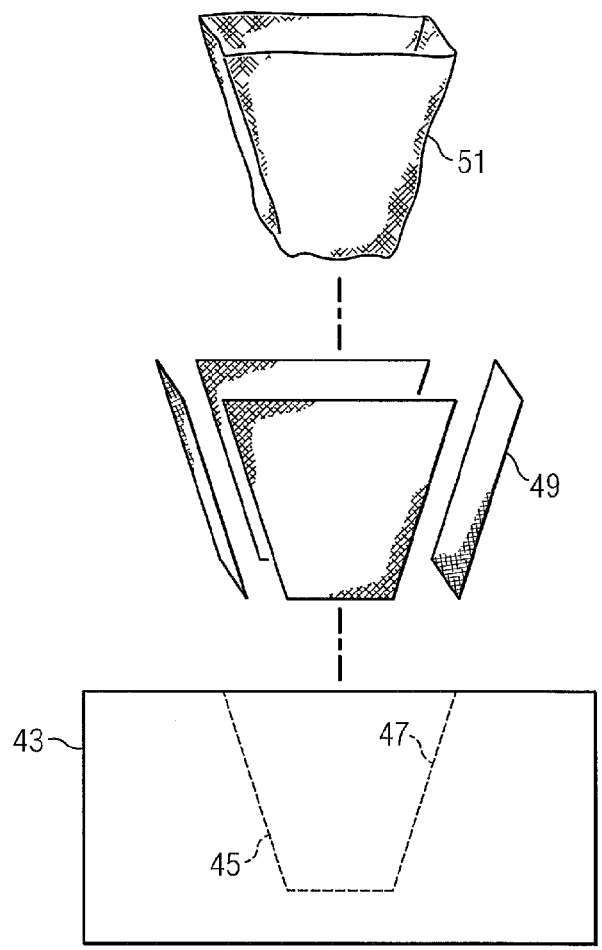
FIG. 6 is an exploded side view of the components used in an alternate method according to the invention for forming molded parts according to the invention.

FIG. 6 shows an alternate method according to the invention for forming the compression-molded parts of the invention. A mold comprises a female die 43 and a matched male die (not shown). Female die 43 comprises a mold cavity 45 having an inner surface 47 shaped for receiving the male die. In the method shown, conductive mesh 49 is shown as being formed of multiple pieces, rather than being a preform, that are inserted into mold cavity 45 and pressed against inner surface 47. The edges of the pieces of mesh 49 are overlapped to ensure a conductive path exists between the pieces of mesh 49.

In addition, FIG. 6 shows a method of preventing or limiting movement of mesh 49 within mold cavity 45 prior to curing of the molding material. To assist in preventing mesh 49 from moving from the desired position on inner surface 47 as the male die is pressed into female die 43, a nonconductive layer, such as fiberglass mat 51, is placed against the inside of mesh 49. Fiberglass mat 51 may be formed as a preform, as shown, or may be inserted as multiple pieces. The male die is then used to compress the molding material in mold cavity 45, and resin within the molding material flows into fiberglass mat 51 and mesh 49. The mold may then be heated to cure the resin, and the finished part is removed from mold cavity 45 after curing.

Figure 7:
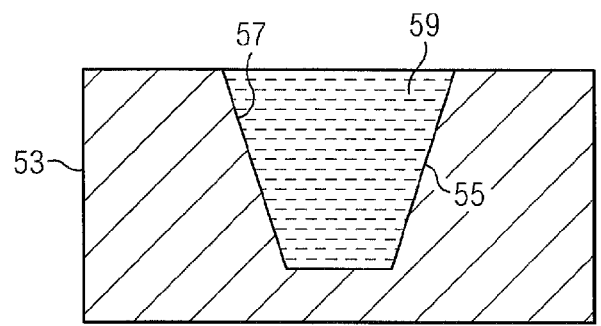
FIG. 7 is a cross-sectional view of a female die for use in a second alternate method according to the invention for forming molded parts according to the invention.

FIG. 7 illustrates an additional method of preventing movement of the conductive mesh within a mold. A female die 53 is shown, die 53 having a mold cavity 55. Inner surface 57 of mold cavity 55 has stippling 59, or a similar raised-surface finish, for preventing or limiting the sliding of the conductive mesh along inner surface 57 as the male die is inserted. Stippling 59 may be used with or without the fiberglass mat of the method shown in FIG. 6 and described above. The use of stippling or other non-smooth surface finish in the mold may be precluded if the outer surface of the finished part is required to be smooth, such as may be required on aerodynamic surfaces.

Though the methods of the invention are shown with the conductive layer being located adjacent the mold surface of the female die, the conductive layer may alternatively be located adjacent the mold surface of the male die. For example, this method may be used when forming bent or concave panels for the exterior of an aircraft.

The present invention provides for several advantages, including: (1) providing a lightweight part having an embedded conductive layer, the layer providing lightning-strike or EMI protection capability or for use as an antenna; (2) providing a method for forming the parts of the invention; and (3) providing methods for inhibiting movement of the conductive layer during forming of the parts of the invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of forming a compression-molded panel having an embedded conductive layer, the method comprising:
   (a) locating a conductive layer adjacent a mold surface of a portion of a compression mold;
   (b) locating a nonconductive layer adjacent the conductive layer, such that the nonconductive layer is interposed between the molding material and the conductive layer;
   (c) locating an uncured molding material adjacent the conductive layer and closing the mold;

(d) pressing the portions of the mold together for causing the molding material to flow within a mold cavity, at least a portion of the molding material flowing into the conductive layer; and (e) curing the molding material within the mold to form a panel, the conductive layer being embedded in the panel generally adjacent an outer surface of the panel;

wherein step (d) further comprises at least a portion of the molding material flowing into the nonconductive layer.

2. The method according to claim 1, further comprising:

prior to step (a), forming the conductive layer as a preform having a shape generally approximating the shape of the mold surface.

3. The method according to claim 1, wherein the conductive layer is formed of multiple overlapping portions.

4. The method according to claim 1, further comprising:

prior to step (a), providing a surface treatment on the mold surface for inhibiting movement of the conductive layer relative to the mold surface during steps (c) through (e).

* * * * *